Aug. 29, 1967  C. R. SELLEN ETAL  3,338,389
LETTERING SET

Filed Oct. 24, 1965  4 Sheets-Sheet 1

*INVENTORS*
CARL R. SELLEN
WILLIAM A. NEITHARDT
WILLIAM J. DREXLER
FRANCESCO COLLURA

Aug. 29, 1967  C. R. SELLEN ETAL  3,338,389
LETTERING SET

Filed Oct. 24, 1965

INVENTORS
CARL R SELLEN
WILLIAM A. NEITHARDT
WILLIAM J. DREXLER
FRANCESCO COLLURA

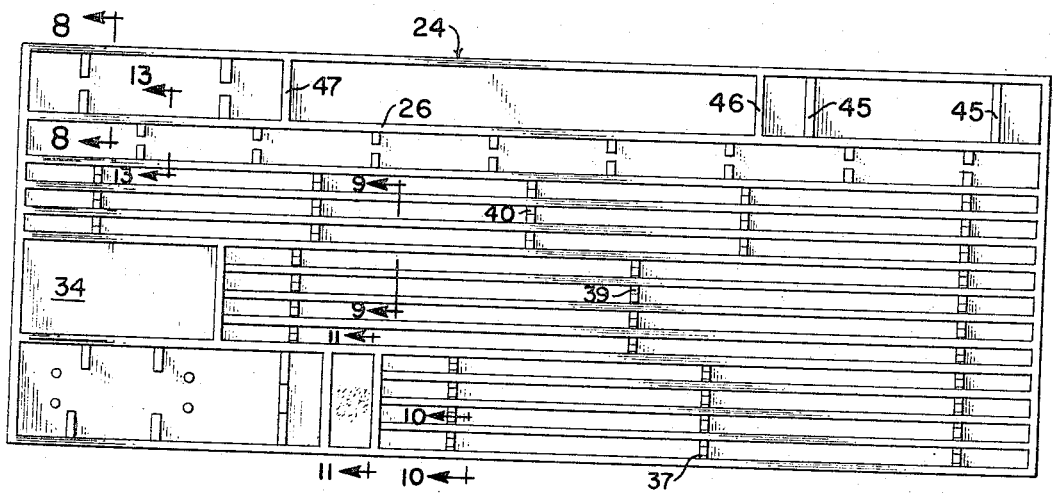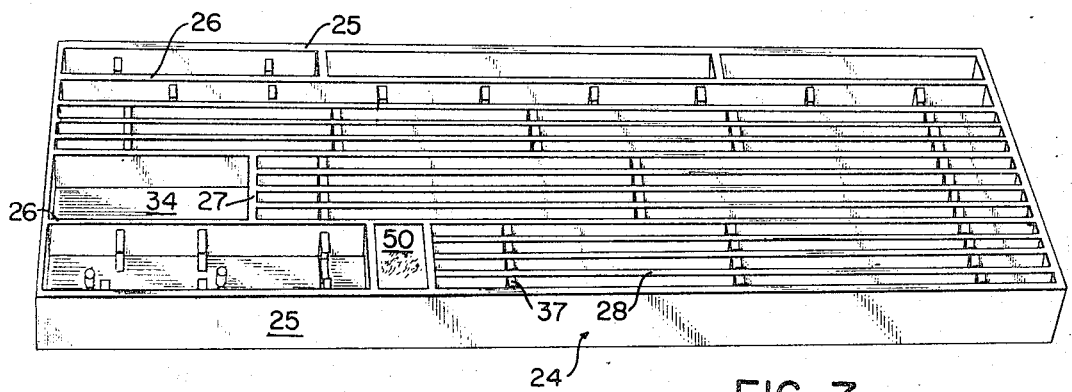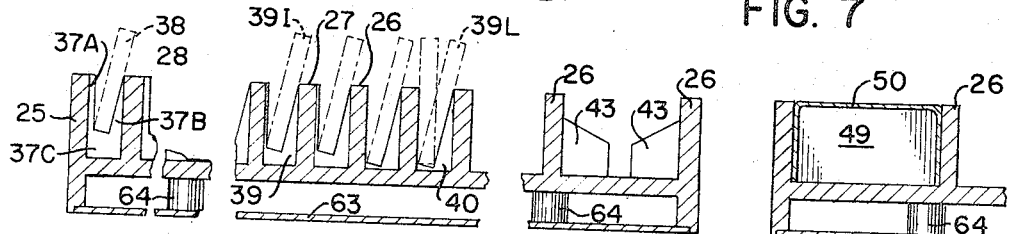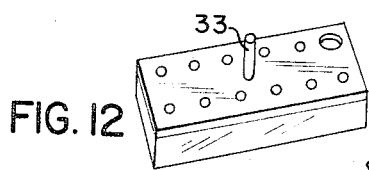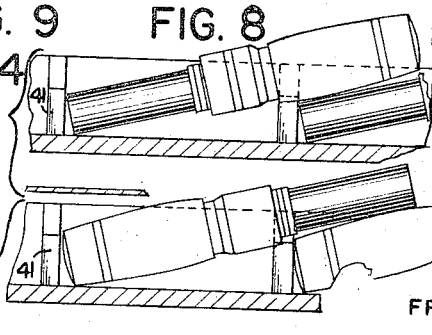

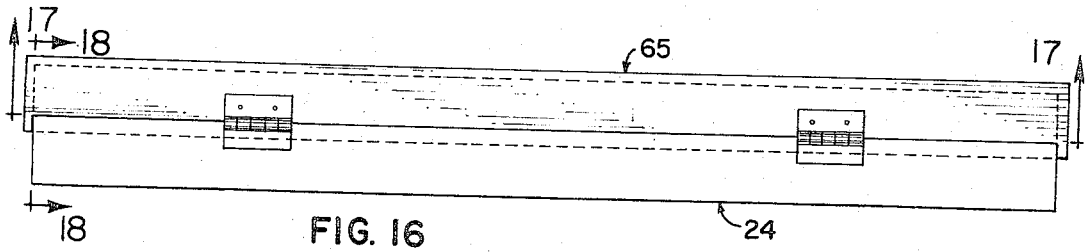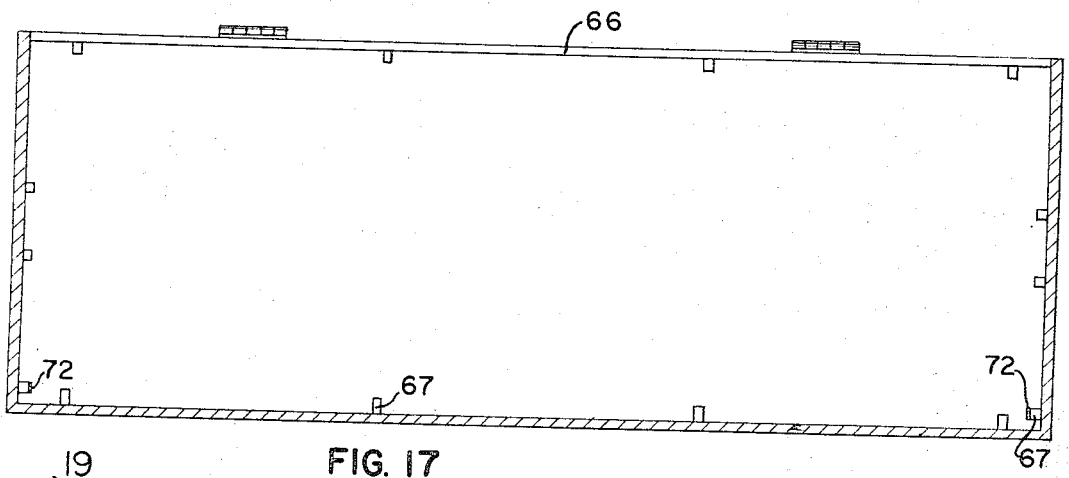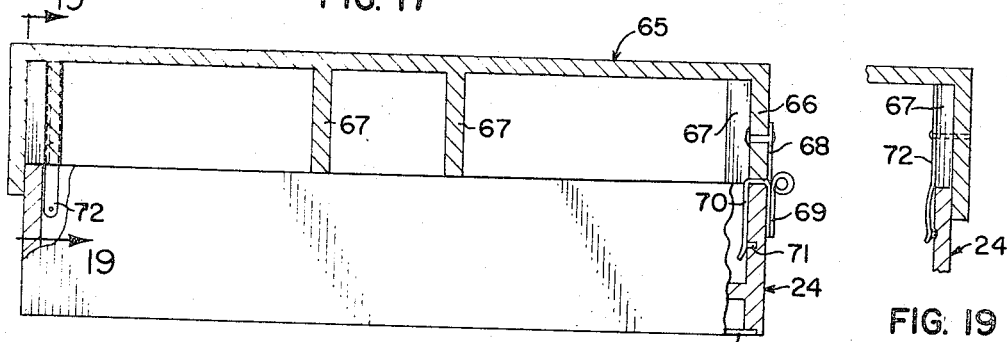

United States Patent Office 3,338,389
Patented Aug. 29, 1967

3,338,389
LETTERING SET
Carl R. Sellen, Paramus, William A. Neithardt, Secaucus, and William J. Drexler, Ridgefield, N.J., and Francesco Collura, New York, N.Y., assignors to Keuffel & Esser Company, Hoboken, N.J., a corporation of New Jersey
Filed Oct. 24, 1965, Ser. No. 504,415
11 Claims. (Cl. 206—16)

The present invention relates to drafting equipment and more particularly to equipment for making letters and other characters by means of templates and a scribing device guided thereby. And the present invention relates to a case for storing the equipment for ready availability and use with a minimum expenditure of effort.

Heretofore drafting equipment and lettering equipment have been housed in a case or box but it has been difficult to observe the contents of the case and determine the precise drafting element required for a specific use.

An object of the present invention is to overcome the deficiencies of the prior art cases for instruments such as drafting equipment and to provide a construction which is readily available for use and for storage of the necessary equipment.

Another object of the invention is to provide a rack for supporting all of the drafting elements required for template guided and free-hand formation of letters, numerals and other characters.

A further object is to provide a case with one or more removable racks therein whereby the drafting equipment may be removed from the case and made readily available with resultant savings in space on a desk or drafting board.

Other and further objects will be apparent as the description proceeds and upon reference to the accompanying drawings wherein:

FIGURES 6 and 7 are plan and perspective views, respectively, of the removable rack with the drafting elements omitted.

Figure 1:
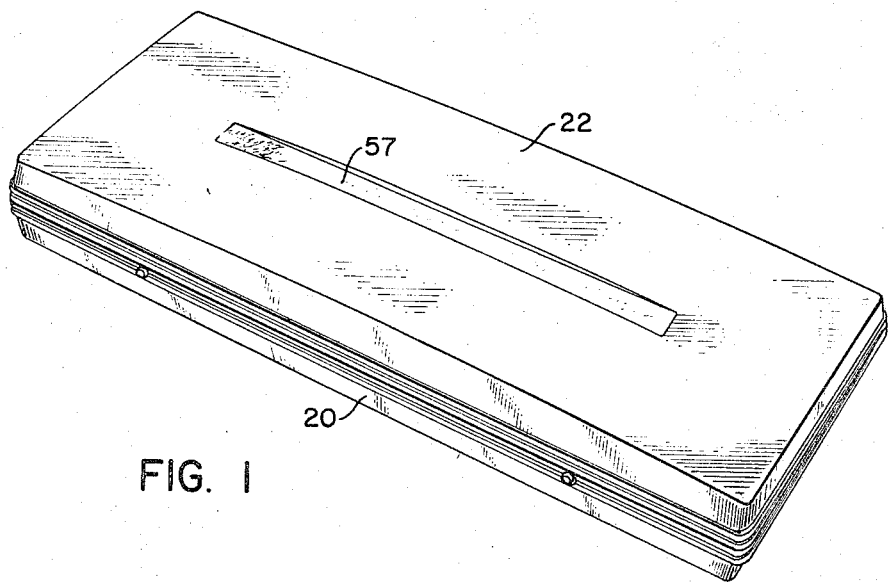
FIGURE 1 is a perspective of the closed case.
Figure 2:
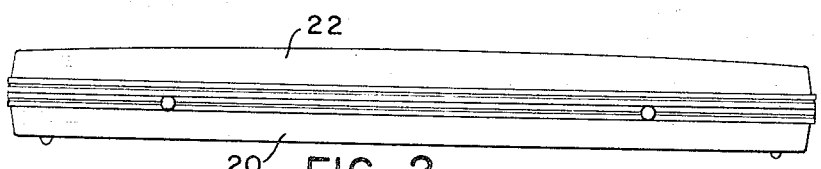
FIGURES 2, 3 and 4 are front elevation, plan view and end elevation, respectively.
Figure 3:
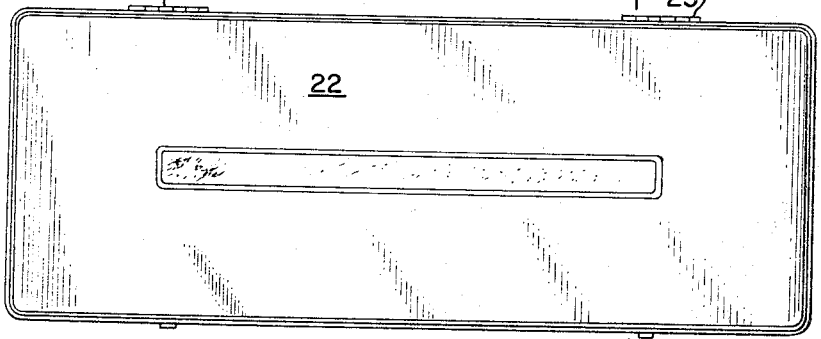
Figure 4:
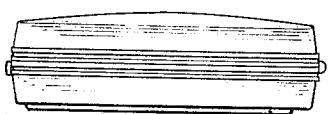

FIGURES 8 to 11, inclusive, and 13 to 15, inclusive, are fragmentary sections taken substantially on the corresponding section lines of FIGURE 6 with the drafting elements shown in some views.

FIGURE 12 is a perspective of a removable rack for supporting pen points and leads for the scriber.

FIGURE 16 is a rear elevation of a modified case using the rack of FIGS. 6 and 7 with a partially telescoping cover hinged to the rear edge thereof.

FIGURE 17 is a section taken on line 17—17 of FIGURE 16 at the top edge of the rack looking upwardly showing the ribs on the cover that abut the top edge of the rack to limit the closing movement of the cover.

FIGURE 18 is an enlarged section taken on line 18—18 of FIGURES 16 and 17 showing an end view of the rack with part broken away to show the mounting of the hinge to permit complete removal of the cover when desired.

FIGURE 19 is a fragmentary section on the same enlarged scale taken on line 19—19 of FIGURE 17 showing a spring latch retaining the front edge of the cover closed.

Referring more specifically to the drawings, the hinged case includes an open top bottom section 20 having a generally flat bottom inner surface 21 and a hollow cover section 22 hingedly connected by hinges 23, 23 to the bottom section. A rack 24 having a substantially flat bottom and a peripheral wall 25 projecting above the open top of the bottom section is snugly received within the side walls of the bottom section, the rack being readily removable from the bottom section by a draftsman so that hinged case can be set aside to increase usable desk space.

The rack 24 is provided with full length longitudinal partitions 26, intremediate longitudinal partitions 27 and relatively short longitudinal partitions 28 with a plurality of transverse partitions extending between some of the longitudinal partitions to provide a number of compartments. A resilient pad 29 is provided in the cover section and is adapted to engage the drafting elements in the closed position as shown in FIGURE 5A, whereby the pad maintains the drafting elements and the rack 24 in a definite fixed position when the case is closed and latched by means of the combination hooks and guide pins 30, 30 on the cover section and the cooperating latch means 31, 31 on the bottom section, the latch means being urged inwardly to securing position by resilient force and releasable by outward movement.

Figure 5:
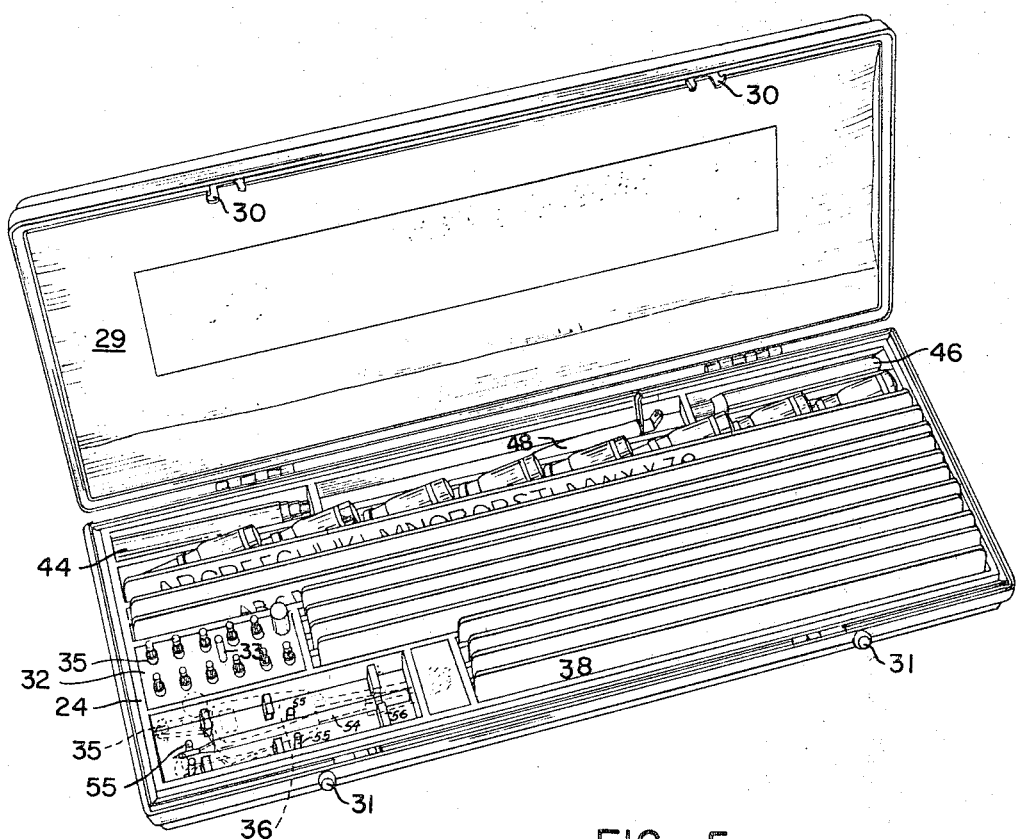
FIGURE 5 is a perspective of the case in open condition showing all of the drafting elements therein with the scriber shown in dotted line to illustrate how a pencil is stored thereunder.
Figure 5A:
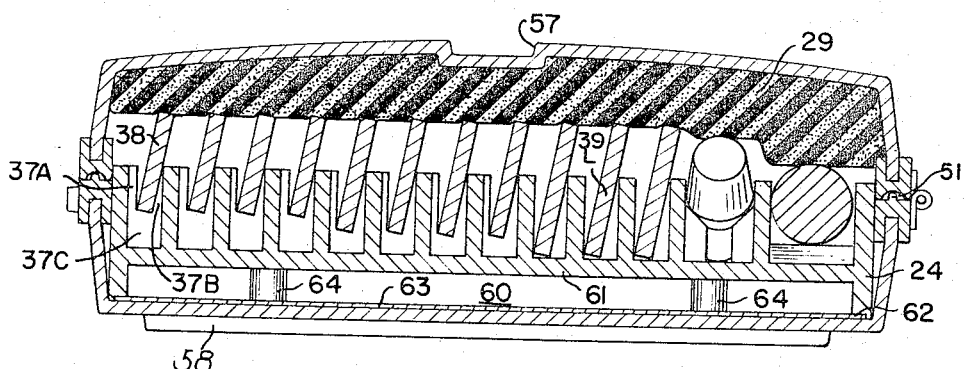
FIGURE 5A is an enlarged section taken substantially on line 5A—5A of FIGURE 2 showing the drafting elements in the closed case and illustrating the uniform locations of the upper edges of the elements with a resilient pad engaging such upper edges to hold the elements in place.

A second rack 32, shown in FIGURE 12 removed from its compartment 34 in the first rack is provided with a handle 33 having its upper end knurled for manipulation of the rack, and is adapted to receive a number of writing implements such as replaceable pens 35 for use with a scriber 36 shown in dotted lines in FIGURE 5.

Extending between the front peripheral wall 25 and the first full length partition 26 are a plurality of saddles 37 shown in FIGURES 6, 7 and 10, and such saddles include a narrow flange 37A extending rearwardly from the front peripheral wall 25 which defines the front edge of a notch having a tapering rear flange 37B which is located on the other side of a base flange 37C, with the base flange 37C having a downwardly and rearwardly inclined upper edge at substantially right angles to the inclined edge of the rear flange 37B, whereby a template 38 shown in dotted lines can be readily inserted in the notch of the partition 37 and such template will automatically assume the position shown in dotted lines in FIGURE 10 due to the center of gravity of such template being located rearwardly of the pivot point defined by the juncture of the front flange 37A and the base flange 37C. Similar saddles 39 and 40 are provided for intermediate size templates 39I and large size templates 39L so the upper edges of all of the templates lie in substantially a single plane as shown in FIGURES 5A, 9 and 10 to engage the resilient pad 29 to maintain the drafting elements in place.

The saddles adjacent the ends of the compartments are spaced from the end peripheral walls a sufficient distance so the draftsman may press downwardly on either end of the template with the saddle adjacent such pressed down end acting as a fulcrum raising the other end for facilitating removal.

Saddle flanges 41, 41, FIGURE 13, lying between the first and second longitudinal partitions 26 from the back have their upper ends converging downwardly toward each other and toward an opening between such saddle flanges for receiving reservoir pens 42 with the reservoir down in FIGURE 14 and the protected pen points extending upwardly. The reservoir may be in a position extending upwardly as shown in FIGURE 15 with the pen point extending downwardly whereby the pen point remains surrounded with ink. The saddle structure is therefore adaptable to the wishes of the respective draftsman without requiring modification of the rack 24.

The tops of saddle flanges 43, 43 (FIGURE 8) taper downwardly and toward each other with an opening therebetween for receiving a handle 44 adapted to be mounted on any one of the reservoir pens 42 for drawing therewith. A pair of saddles 45, 45, FIGURES 6 and 7, have continuous top edges spaced from the top of the rack 24 providing a support for a tube of drawing ink 46 with the inner end of the tube being confined by a transverse partition 46 which in cooperation with another transverse partition 47, the rear peripheral wall 25 and the adjacent longitudinal partition 26 provide another compartment for supporting a pen holder 48 which is adapted to receive the pens 35.

A compartment 49, FIGURE 11, is provided with a U-shaped resilient cover 50 to retain small objects within the compartment with the legs of the resilient cover 50 adapted to frictionally engage the walls of the compartment thereby preventing unintentional removal of the cover.

As shown in FIGURE 5A, the drawing implements are effectively retained in the closed case with the resilient pad of rubber-like material 29 pressing against the upper surfaces of the various implements, thereby effectively retaining such implements in position. The shape and the position of the saddles for the templates 38, 39I, and 39L maintain the templates in straight condition preventing warpage.

A tongue 51 is provided on the upper edge of the peripheral wall of the bottom section and a cooperating groove is provided around the periphery of the lower edge of the peripheral wall of the top section, thereby providing a substantially dust-tight and generally fluid-tight joint whereby damaging fluids cannot enter the case and a desiccant or the like may be enclosed within the case to absorb excessive humidity.

The cover 22 has a longitudinally extending central recess 52 along its inner surface for receiving an instruction sheet 53 of substantially rigid material but the marginal portions of the resilient pad 29 engage the implements in the case including the scriber 36 preventing displacement thereof. The scriber 36 overlies a pencil 54 in the bottom of the scriber receiving compartment, the pencil being retained in place by suitable pins 55, 55 and supporting saddle elements 56. The scriber 36 (shown in dotted lines) is held in proper position so pen 35 shown in dotted lines may be left on the scriber for storage, making it unnecessary for the draftsman to disassemble the pen from the scriber after each use.

A rigidifying groove 57 is provided in the cover 22 by displacing the material of the top section an appreciable amount to provide a substantially straight flat corrugation lengthwise of the convexly curved top section 22 and also providing a flat surface on which the instruction card 53 may be mounted. An identifying legend is applied in the groove 57 to indicate the source of the lettering set. Suitable feet 58 in the form of transversely extending ribs are provided transversely of the bottom section 20 to additionally rigidify the bottom section. The hinge pin is spaced the same vertical distance from the hinge pin to the upper outside surface of the top section as the vertical distance from the hinge pin to the bottom of the feet 58 permitting the case to be opened 180° while supported on a flat surface without strain on the hinges.

It will be apparent that the rack 24 may be removed from the case with the drafting implements and the case can be set aside thereby reducing the amount of space required to have the drafting elements readily available since the rack takes up less than one-half of the space of an open case.

The rack 24 is shown with a hollow chamber under a floor 61 of the rack formed by downward extensions of the peripheral walls of the rack. Inwardly opening rabbets are provided in the lower edges of the peripheral walls and receive a relatively thin plate 63 to provide the flat bottom. Struts 64 extend between the plate 63 and the floor 61 to add rigidity to the plate and such struts are integral cast elements molded in the casting of the rack 24. The struts 64 have no taper while the partitions on the upper surface of the floor are provided with taper to permit ease of removal of the upper portion of the rack from the mold. The struts serve to strip the rack from the mold forming the upper portion of the rack. Ejection pins engage the extremities of the struts 64 for complete removal of the rack 24 from the mold after the casting process.

Referring to FIGURES 16 to 19, inclusive, the rack 24 with the bottom plate 63 therein is provided with a cover 65 having a narrow rear wall 66 and wider front and end walls so the rear wall 66 has its bottom edge in abutment with the rear wall of the rack while the front and end walls of the cover overlap the rack.

Reinforcing web elements are provided in the cover and extend downwardly a distance corresponding to the height of the rear wall thereby fixing the position of the closed cover on the rack.

A hinge leaf 68 is secured to the cover 65 by rivets or the like while the lower hinge leaf 69 is secured to a U-shaped spring 70 having a lug 71 extending into an aperture on the inner surface of the back wall of the rack 24 whereby the hinge leaf 69 may be detached from the rack 24 and the rack may be used with the implements therein in the manner previously described.

To releasably secure the front edge of the cover to the rack 24, a leaf spring 72 is mounted by suitable means on one of the webs 67 at the front corner of the cover to engage the adjacent wall of the rack and thereby retain the cover in position. The height of the cover is selected to retain the drafting implements in position even though the rack 24 and the cover 65 is inverted and therefore the parts are proportioned to accomplish this result in a manner similar to that described with respect to the prior modification.

It will be apparent that changes may be made within the spirit and scope of the invention as defined by the valid scope of the appended claims.

What is claimed is:

1. A case with lettering equipment therein comprising a hollow open top bottom section having a generally flat bottom inner surface, a hollow cover section hinged to said bottom section, a rack having a generally flat bottom outer surface positioned in said bottom section, said rack having a plurality of longitudinal partitions and transverse partitions defining compartments, saddles arranged in spaced relation between the longitudinal partitions and secured to said rack, drafting elements in the spaces defined by the partitions with the drafting elements projecting above the rack substantially equal amounts, a resilient pad on the inner surface of said cover section engaging the upper portions of the drafting elements when the cover section is in closed relation with said bottom section maintaining the drafting elements in place in the rack, and releasable means for securing the cover section in closed condition.

2. The invention according to claim 1 in which a second rack is positioned within said first rack in one of the compartments and recess means are provided in said second rack for receiving drafting implements.

3. The invention according to claim 1 in which the rack is of a height greater than the depth of the bottom section whereby a margin of the rack projects above the top of the bottom section.

4. A case for lettering equipment comprising a hollow open top bottom section, a cover section for cooperation with said bottom section, said bottom section including a rack, longitudinal and transverse partitions defining compartments, saddles arranged in spaced relation in the compartments for supporting drafting elements of varying heights with at least some of the drafting elements projecting above the rack substantially equal distances, some of said saddles having their upper portions supporting the drafting elements at varying heights to cooperate with the varying heights of the drafting elements, means on said cover section for engaging the drafting elements when the cover section closes said bottom section to maintain the drafting elements in place in the rack, and releasable means to secure the cover section on the bottom section to maintain the drafting elements against displacement.

5. The invention according to claim 4 in which a second rack is positioned within said first rack in one of the compartments and recess means are provided in said second rack for receiving smaller drafting implements.

6. A case for drafting instruments comprising an open top rack having a bottom, longitudinal and transverse partitions and a peripheral wall, a cover of the same general shape as the rack having a narrow rear wall abutting the rear wall of the rack and having side and front walls overlapping the corresponding walls of the rack, hinges connecting the abutting rear walls of the cover and rack, and means to connect the front portion of the rack to the cover to prevent the cover from becoming unintentionally displaced.

7. A rack for supporting a number of articles including elongated templates, said rack having a plurality of longitudinal partitions, saddles extending between the partitions, each saddle having a notch formed therein of a size to receive a template, the bottom of each notch sloping downwardly from one partition toward the next adjacent partition therebehind, said saddle having a rearwardly sloping edge adjacent the notch whereby all of the templates slope rearwardly at substantially the same angle, the notches being of a depth to cause the top edges of the templates to lie in a plane so a single plane cover will retain the templates in place.

8. A rack for drawing implements comprising longitudinal and transverse partitions forming compartments, saddle flanges in at least some of the compartments, said saddle flanges having downwardly converging upper surfaces for supporting reservoir pens, some of the saddles terminating short of the upper surface of the rack and spaced apart a distance greater than half the length of a reservoir pen whereby the reservoir of the pen may extend downwardly between the saddles and the pen covered by the cap may rest on the saddle preventing ink from remaining in contact with the pen, said structure permitting reverse support of the pens with the pen points extending downwardly and the pen point of one reservoir pen overlapping the reservoir of the other.

9. A rack with lettering instruments and templates therein comprising a generally rectangular frame having a floor and longitudinal and transverse partitions therein, instrument supporting saddles of varying height between at least some of the partitions, instruments resting in the saddles and projecting above the rack equal distances whereby a cover may be placed on the rack and the instruments and templates will be retained in place even though the rack and cover combination is overturned.

10. A case with lettering equipment therein comprising a hollow open top bottom section having a generally flat bottom inner surface, a hollow cover section hinged to said bottom section, a removable rack having a base adapted to be supported on a flat surface positioned in said bottom section, said rack having a plurality of longitudinal partitions and transverse partitions defining compartments, saddles arranged in spaced relation between the longitudinal partitions and secured to said rack, drafting elements in the spaces defined by the partitions with the drafting elements projecting above the rack substantially equal amounts, a resilient pad on the inner surface of said cover section engaging the upper portions of the drafting elements when the cover section is in closed relation with said bottom section maintaining the drafting element in place in the rack, and releasable means for securing the cover section in closed condition.

11. The invention according to claim 4 in which the saddles have downwardly converging upper surfaces for supporting drafting elements.

References Cited

UNITED STATES PATENTS

| 857,240 | 6/1907 | Henning | 206—72 |
| 2,332,861 | 10/1943 | Langsner | 206—16 |
| 2,695,112 | 11/1954 | Bonnevay | 217—7 |
| 2,795,430 | 6/1957 | Broad | 206—72 |
| 3,145,841 | 8/1964 | McGuire | 206—72 |

FOREIGN PATENTS 642,536  9/1950  Great Britain.

THERON E. CONDON, *Primary Examiner.*

WILLIAM T. DIXSON, Jr., *Examiner.*